June 23, 1925.

C. B. BOHN ET AL 1,543,657

MOLD

Filed Nov. 20, 1922    9 Sheets-Sheet 1

INVENTORS:
Charles B. Bohn
By Daniel Frown
Ray S. Gehr
ATTORNEY

June 23, 1925.

C. B. BOHN ET AL 1,543,657

MOLD

Filed Nov. 20, 1922

INVENTORS:
Chas. B. Bohn
Daniel Frown
BY Ray S. Gehr
ATTORNEY.

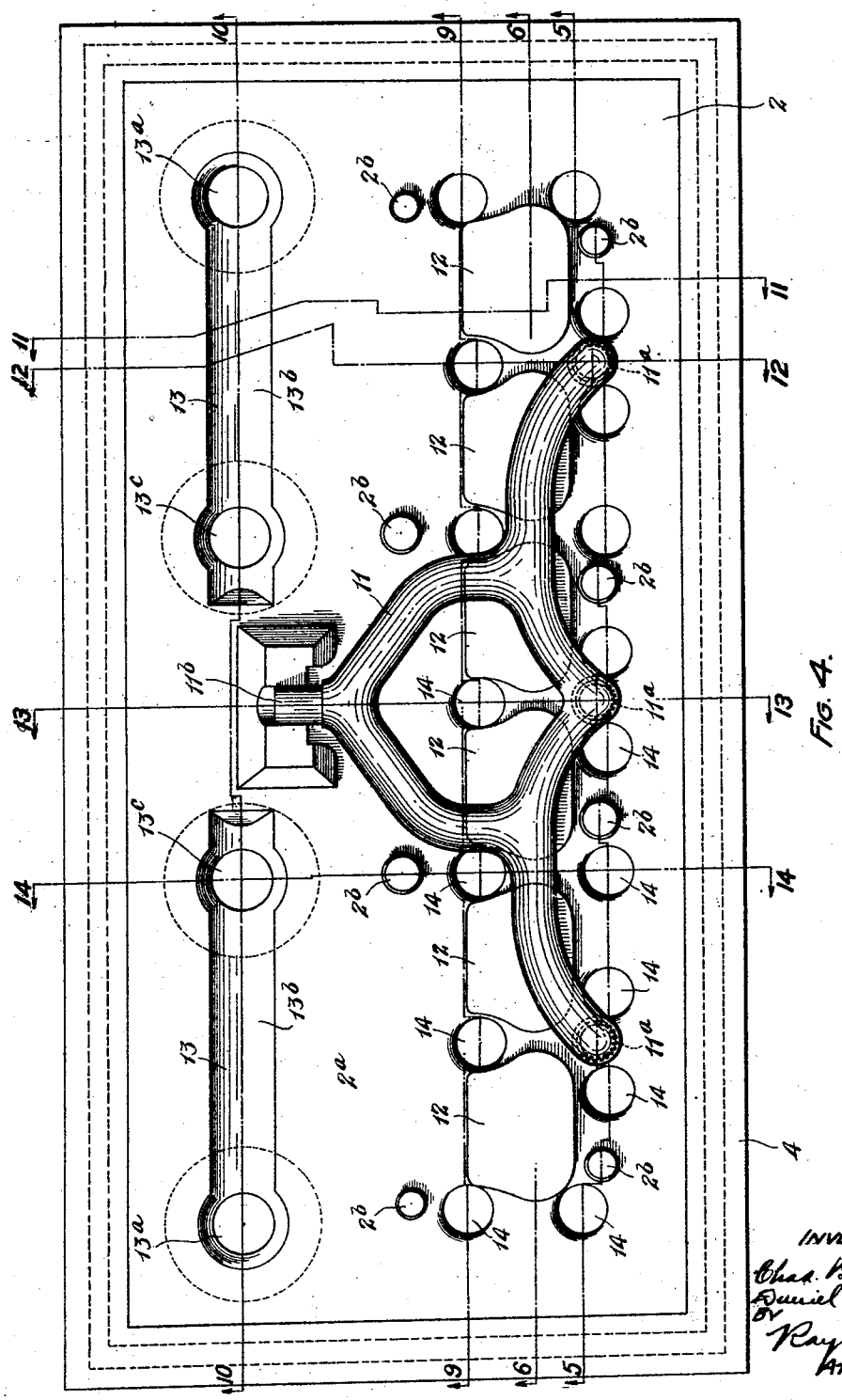

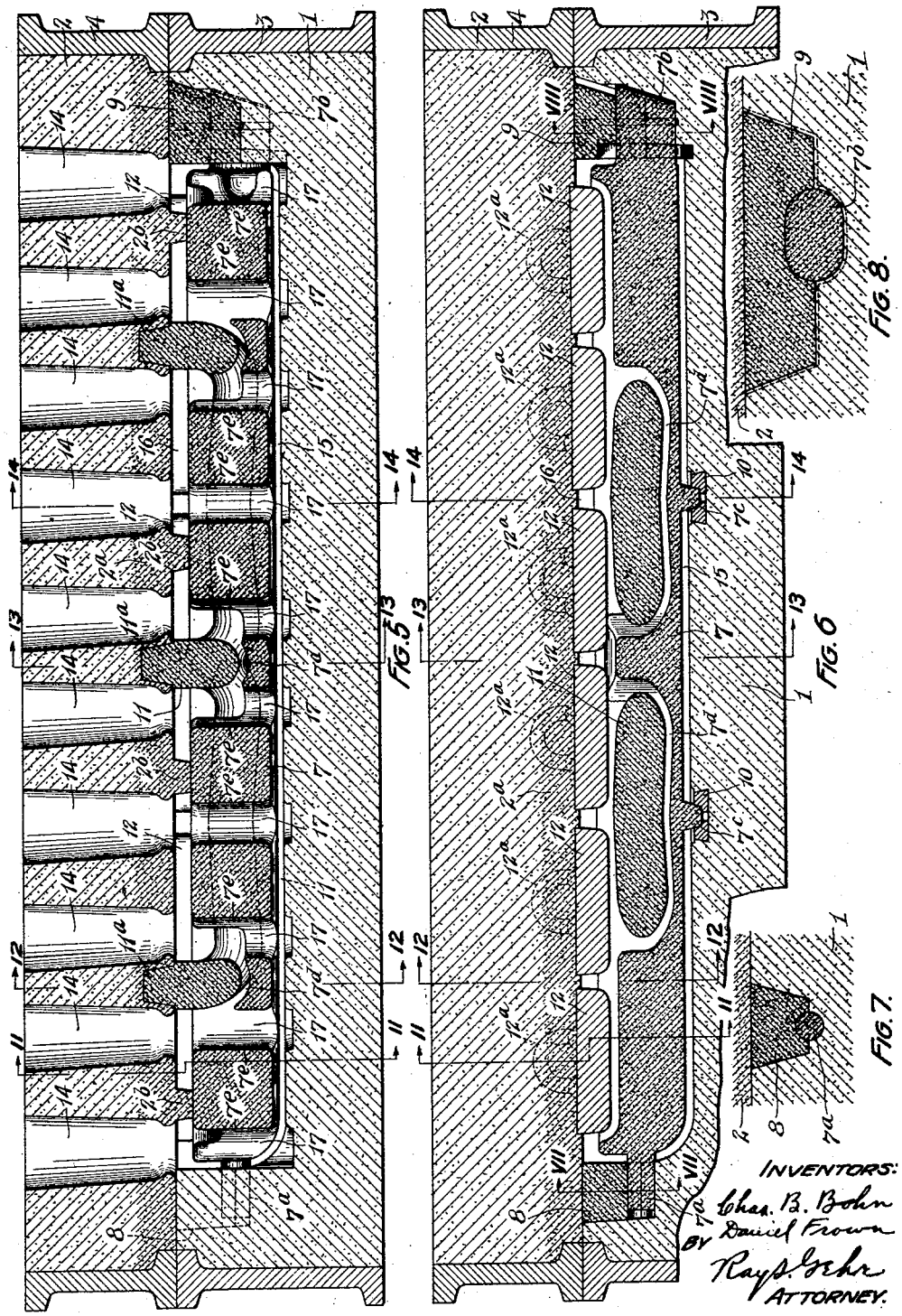

June 23, 1925. 1,543,657
C. B. BOHN ET AL
MOLD
Filed Nov. 20, 1922 9 Sheets-Sheet 5
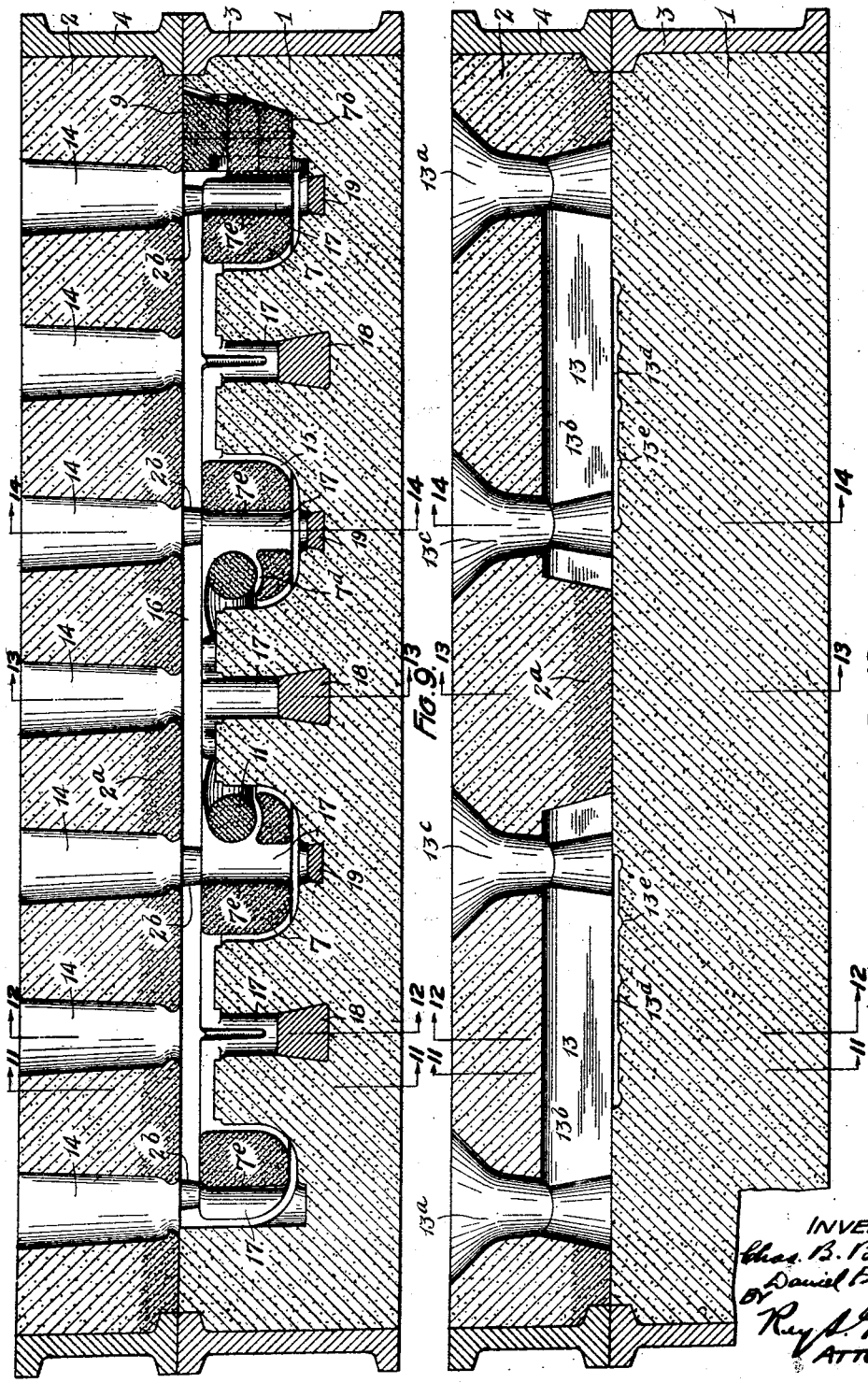

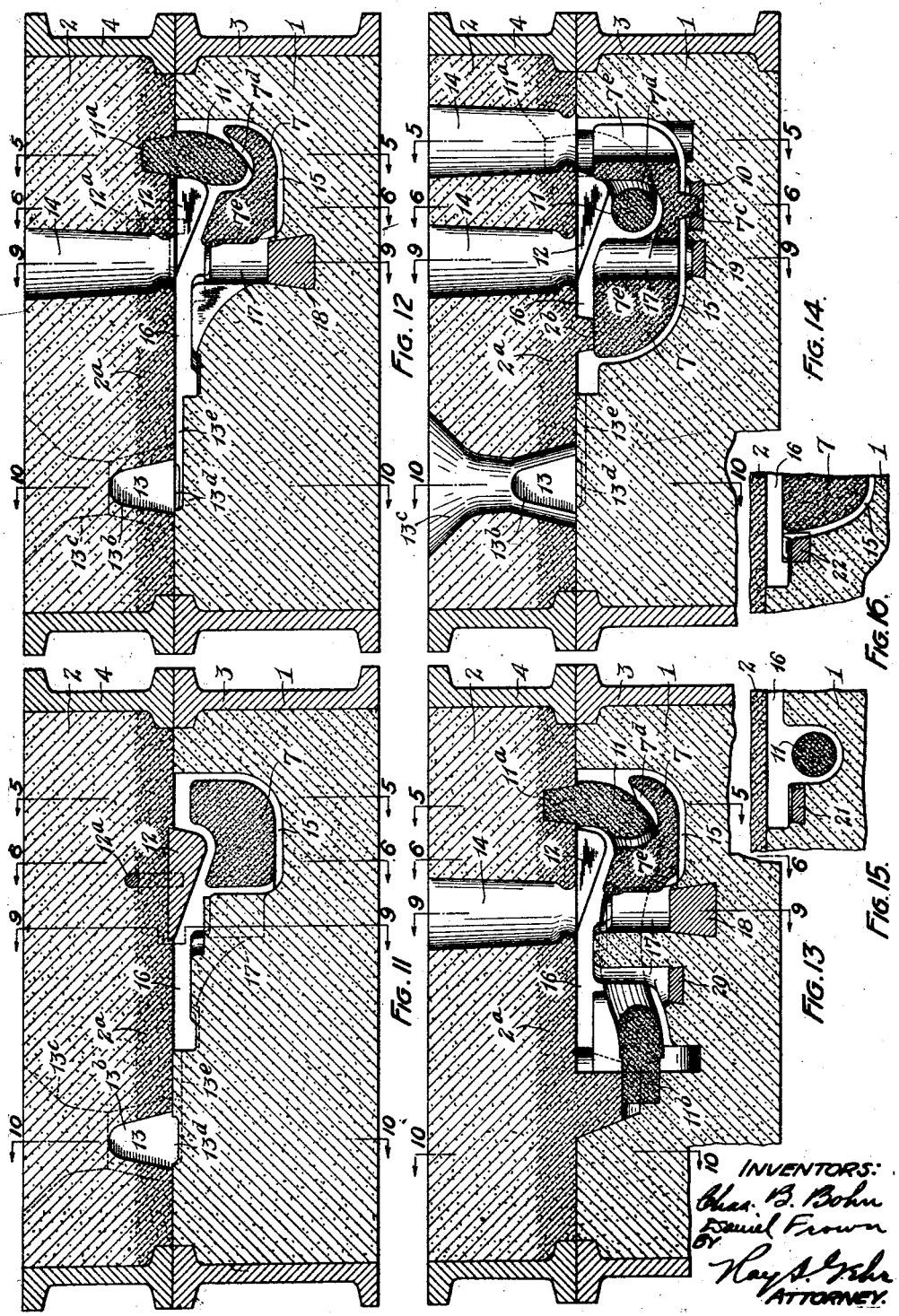

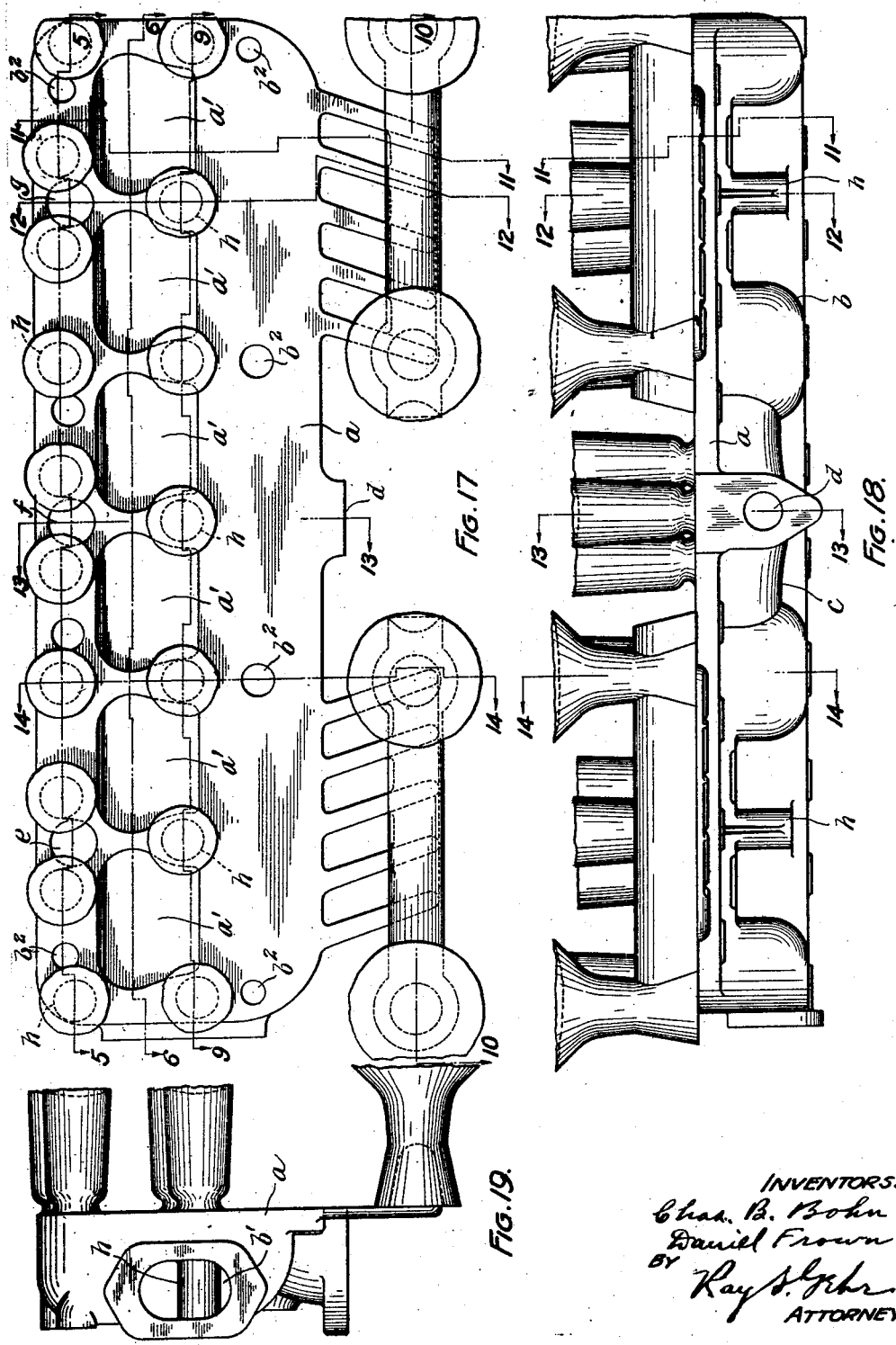

June 23, 1925. 1,543,657
C. B. BOHN ET AL
MOLD
Filed Nov. 20, 1922 9 Sheets-Sheet 8
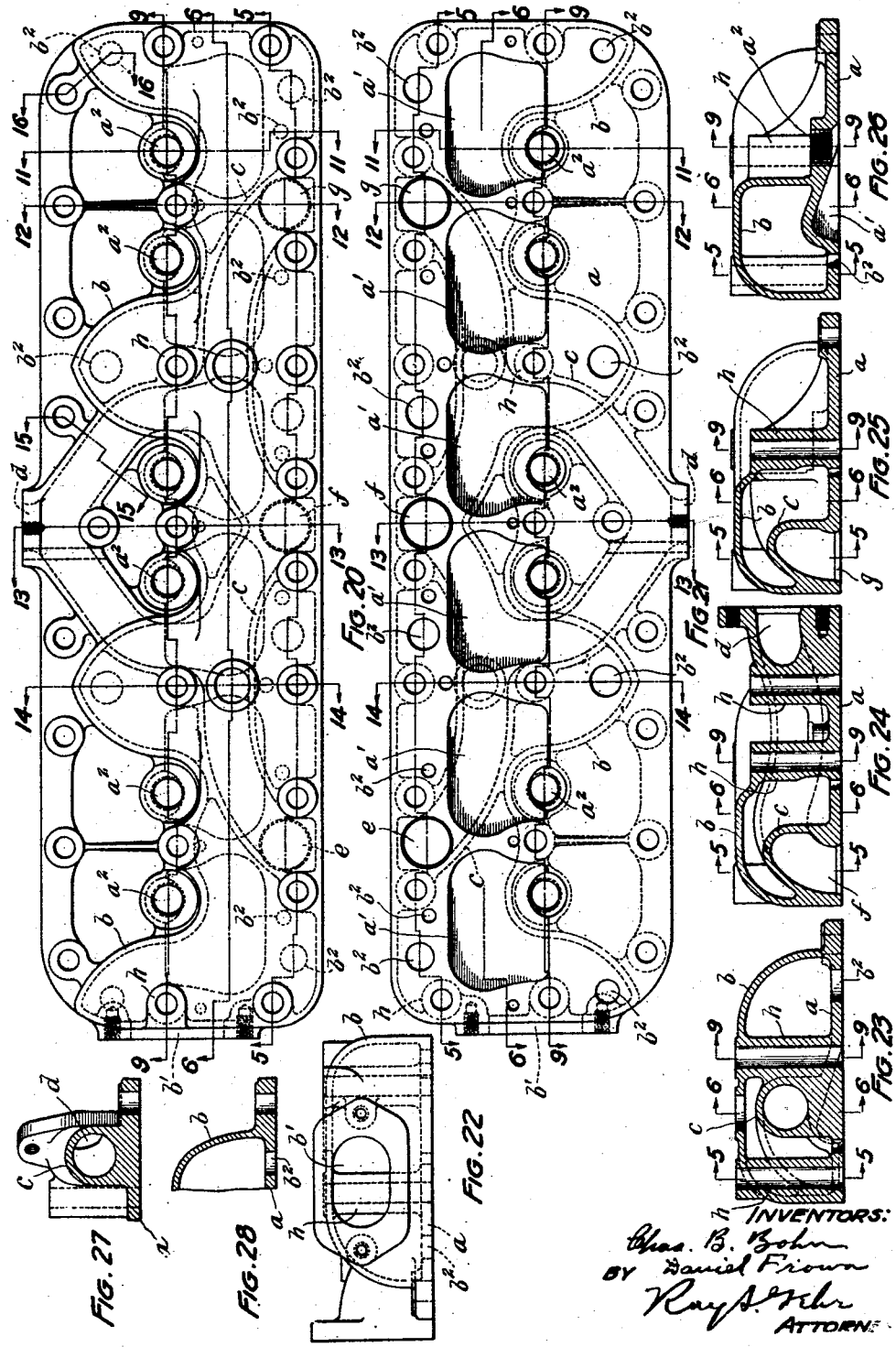

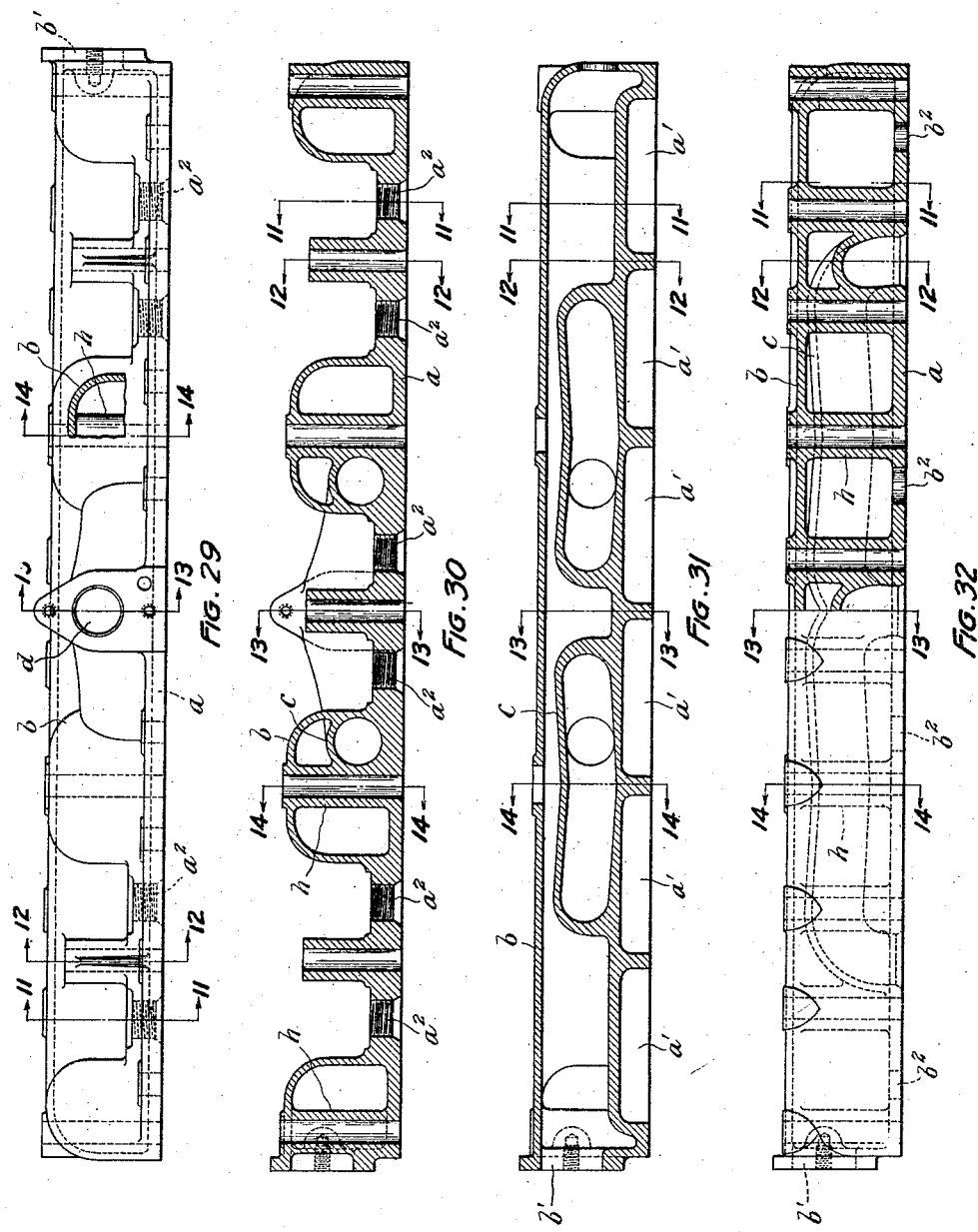

Patented June 23, 1925.

1,543,657

UNITED STATES PATENT OFFICE.

CHARLES B. BOHN AND DANIEL FROWN, OF DETROIT, MICHIGAN, ASSIGNORS, BY MESNE ASSIGNMENTS, TO BOHN ALUMINUM & BRASS CORPORATION, OF DETROIT, MICHIGAN, A CORPORATION OF MICHIGAN.

MOLD.

Application filed November 20, 1922. Serial No. 601,993.

*To all whom it may concern:*

Be it known that we, CHARLES B. BOHN and DANIEL FROWN, citizens of the United States, residing at Detroit, in the county of Wayne and State of Michigan, have invented new and useful Improvements in and Relating to Molds, of which the following is a specification.

The invention relates to molds for making castings of the alloys of light-weight metals such as aluminum and magnesium and especially cylinder head castings for internal combustion engines and other castings of a similar character.

Heretofore it has been found difficult to produce aluminum alloy and magnesium alloy castings free from porosity and shrinkage cracks and draws. These defects have been especially troublesome in the case of the more complicated cored castings in which the thickness of the sections or walls varied widely and abruptly, water-jacketed cylinder head castings being typical.

The marked tendency of aluminum alloy castings to be porous is probably due to the low melting point of these metals and the relatively low temperature at which they are poured, in comparison with iron or steel castings. On account of the low pouring temperature of the light-weight metal alloys the castings freeze or solidify very much quicker than do iron or steel castings and any gas or vapor occluded in the molten metal is much less likely to escape. The shrinkage cracks and draws, also, are largely explained by the rapid freezing of the light-weight alloys although their high crystallization shrinkage is also a factor. If the casting has some sections thinner than others, these thin sections, freezing rapidly, may cut off other still molten sections from the source of molten metal supply capable of making up for the crystallization shrinkage of the sections thus cut off and the result in such a case is shrinkage draws or cracks or both.

While the desirability of making cylinder heads of internal combustion engines of aluminum or magnesium alloys has been recognized for some time, the commercial production of such heads has not been feasible prior to our invention because of the impossibility of overcoming the defects, above referred to, due to porosity and crystallization shrinkage. Accordingly one of the chief objects of the present invention is to overcome porosity in castings of the character in question.

Another object of the invention is to prevent shrinkage cracks and draws in such castings.

A further object of the invention is to uniformly maintain the accuracy of the dimensions of cored castings made in sand molds.

Another object of the invention is to produce cylinder head castings adapted to be given a smooth finish on their combustion chamber surfaces with a minimum of machining.

Another object of the invention is to provide a composite mold made in part of green sand and in part of baked sand in which the separation and handling of the two kinds of sand after the mold is broken up are facilitated.

Another object of the invention is to provide an improved gating for molds of the character in question.

Further objects of the invention more or less ancillary to the foregoing will appear in the following description in which is set forth in connection with the accompanying drawings a preferred form of mold for the production of water-jacketed cylinder head castings, In the drawings, Fig. 1 is a plan view of the mold on a reduced scale.

Fig. 4 is a bottom plan view on the same scale of the mold cope.

Fig. 5 is a section on the broken line V—V, Fig. 1, but on the same scale as Figs. 3 and 4, the section being indicated in certain of the other figures by the line 5—5.

Fig. 6 is a similarly enlarged section on the broken line VI—VI, Fig. 1, the location of the section being indicated on certain of the other figures by the line 6—6.

Fig. 7 is a fragmentary section on the line VII—VII, Fig. 6.

Fig. 8 is a fragmentary section on the line VIII—VIII, Fig. 6.

Fig. 9 is an enlarged section on the broken line IX—IX, Fig. 1; the location of the section being indicated on certain of the other figures by the line 9—9.

Fig. 10 is an enlarged section on the broken line X—X, Fig. 1, the location of the section being indicated on certain of the other figures by the line 10—10.

Fig. 11 is an enlarged section on the broken line XI—XI, Fig. 1, the location of the section being indicated on certain of the other figures by the line 11—11.

Fig. 12 is an enlarged section on the broken line XII—XII, Fig. 1, the location of the section in certain of the other figures being indicated by the line 12—12.

Fig. 13 is an enlarged section on the line XIII—XIII, Fig. 1, the location of the section being indicated in certain of the other figures by the line 13—13.

Fig. 14 is an enlarged section on the line XIV—XIV, Fig. 1, the location of the section being indicated in certain of the other figures by the line 14—14.

Fig. 15 is a fragmentary section on the broken line XV—XV, Fig. 3, the location of the section being indicated in certain of the other figures by the line 15—15.

Fig. 16 is a fragmentary section on the broken line XVI—XVI, Fig. 3, the location of the section being indicated in certain of the other figures by the line 16—16.

Fig. 17 is a plan view of the casting made in our improved mold including the sprues, gates and risers, some of the parts being broken away on account of space restrictions.

Fig. 18 is a side elevation of the casting shown in Fig. 17.

Fig. 19 is an end elevation of the casting shown in Fig. 17.

Fig. 20 is a plan view of the machine-finished casting.

Fig. 21 is a bottom plan view of said finished casting.

Fig. 22 is an end elevation of the casting.

Fig. 23 is a section on the line 14—14, Fig. 20.

Fig. 24 is a section on the line 13—13, Fig. 20.

Fig. 25 is a section on the line 12—12, Fig. 20.

Fig. 26 is a section on the broken line 11—11, Fig. 20.

Fig. 27 is a fragmentary section on the line 15—15, Fig. 20.

Fig. 28 is a fragmentary section on the line 16—16, Fig. 20.

Fig. 29 is a side elevation of the finished cylinder head.

Fig. 30 is a section on the broken lines 9—9 in Figs. 20, 21 and 23-26.

Fig. 31 is a section on the broken lines 6—6, Figs. 20, 21 and 23-26.

Fig. 32 is a view partly in side elevation and partly in section, the section being taken on the broken line 5—5, Figs. 20, 21 and 23-26.

Figure 1:
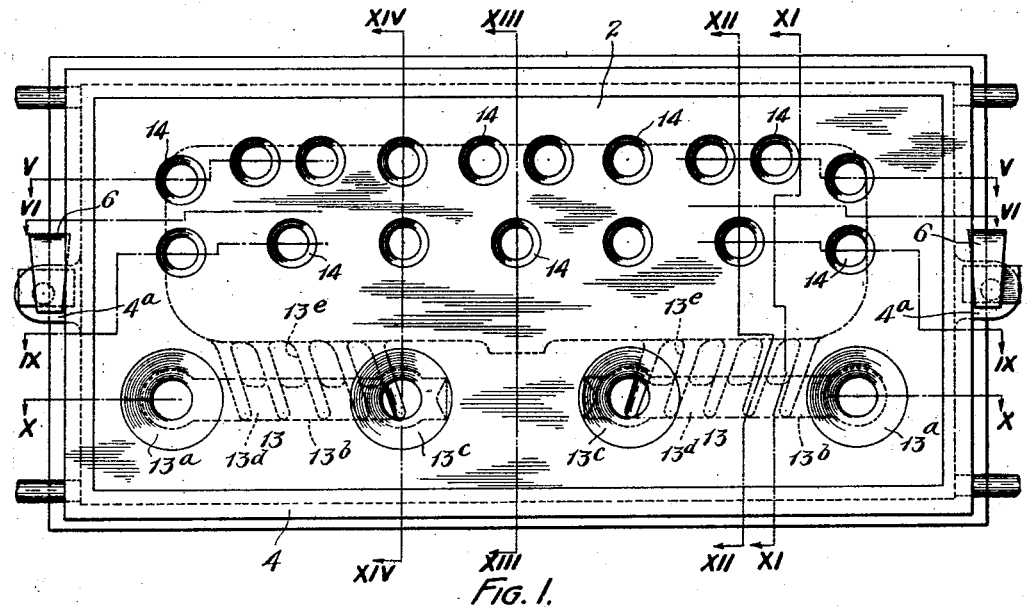
Figure 2:
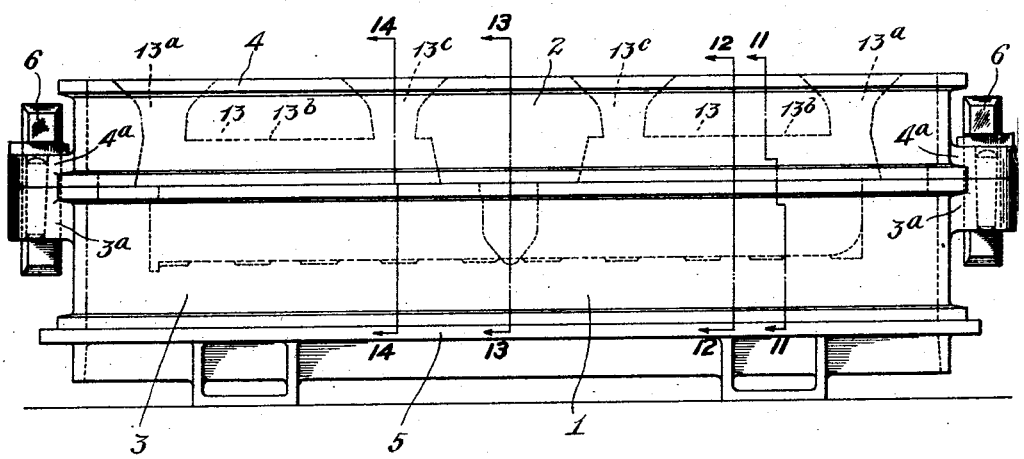
Fig. 2 is a side elevation of the same.

Inasmuch as the significance of our improved mold construction is especially related to the character of the casting produced by it, reference will first be had to the casting itself as shown in Fig. 17 to 32, inclusive. Referring to the finished cylinder head as shown in Figs. 20 to 32, inclusive, it will be observed that the head comprises a main wall $a$, a water-jacket wall $b$ and walls $c$ forming a branching fuel intake passage with an inlet $d$ and three outlets at $e$, $f$ and $g$. The head is intended for use on a six-cylinder side-valve engine and the three outlets $e$, $f$ and $g$ are designed to register each with a passage in the cylinder casting, which latter passage divides, with one branch leading to the valve-controlled inlet of one cylinder and the other branch leading to the valve-controlled inlet of a second, adjacent cylinder. The main head wall $a$ and the jacket wall $b$ are connected by a plurality of through-bolt bosses $h$, $h$.

The inner side of the cylinder head has a plain flat surface except for the six recesses $a'$ which are formed to accommodate the lift of the inlet and exhaust valves of the six cylinders. The wall $a$ is formed with six spark plug openings $a^2$ and at one end of the head, the jacket wall $b$ is formed with a water outlet opening $b'$. The cooling water finds its way into the jacket space through various openings, $b^2$, $b^2$ in the wall $a$ which communicate with the water jacket space in the cylinder casting.

As has been indicated above, Figs. 20 to 32, inclusive, show the cylinder head in its finished state resulting from the machining of the casting. It is unnecessary to refer to all of the various machine finishing operations but two of them should be mentioned because of their relation to the production of the casting. The various through-bolt bosses of the head as a practical matter must be cast solid and then drilled out to receive the bolts. The result is that the casting has some relatively thin sections and some very heavy sections, and the thin sections merge more or less abruptly into the heavy sections. Thus the water-jacket walls $b$ are thin while the bolt boss sections are exceedingly heavy. In fact the main wall $a$ of the head casting is substantially heavier than the jacket wall $b$ and in a number of instances, as shown for example in Figs. 23 and 24, it is practically impossible to avoid extra masses of metal where the wall $a$, the bolt bosses $h$, $h$ and the fuel passage walls $c$ merge.

The second machine-finishing operation referred to, is that of the inner side of the casting. It will be observed that this inner side of the cylinder head has a plain flat surface throughout except for the recesses $a'$. Obviously the flat portions of this surface are susceptible of machine-finishing by a simple operation. The manner in which the recesses $a'$ are provided with a smooth finish will be referred to below in the description of the mold.

Turning now to the mold as illustrated in Figs. 1 to 16, inclusive, it comprises a drag 1 and a cope 2 which are enclosed in the lower and upper sections 3 and 4 of a suitable two-part flask. The mold rests upon a suitable board or base 5. Preferably the two sections of the flask are formed of metal castings having their abutting edges accurately machined so that they fit nicely together. The base 5 is also preferably in the form of metal casting with its flat top surface smoothly finished. The flask sections are formed with the usual ears or lugs $3^a$, $4^a$ to be engaged by clamps 6 that serve to hold the flask sections securely together while the casting is being poured.

Figure 3:
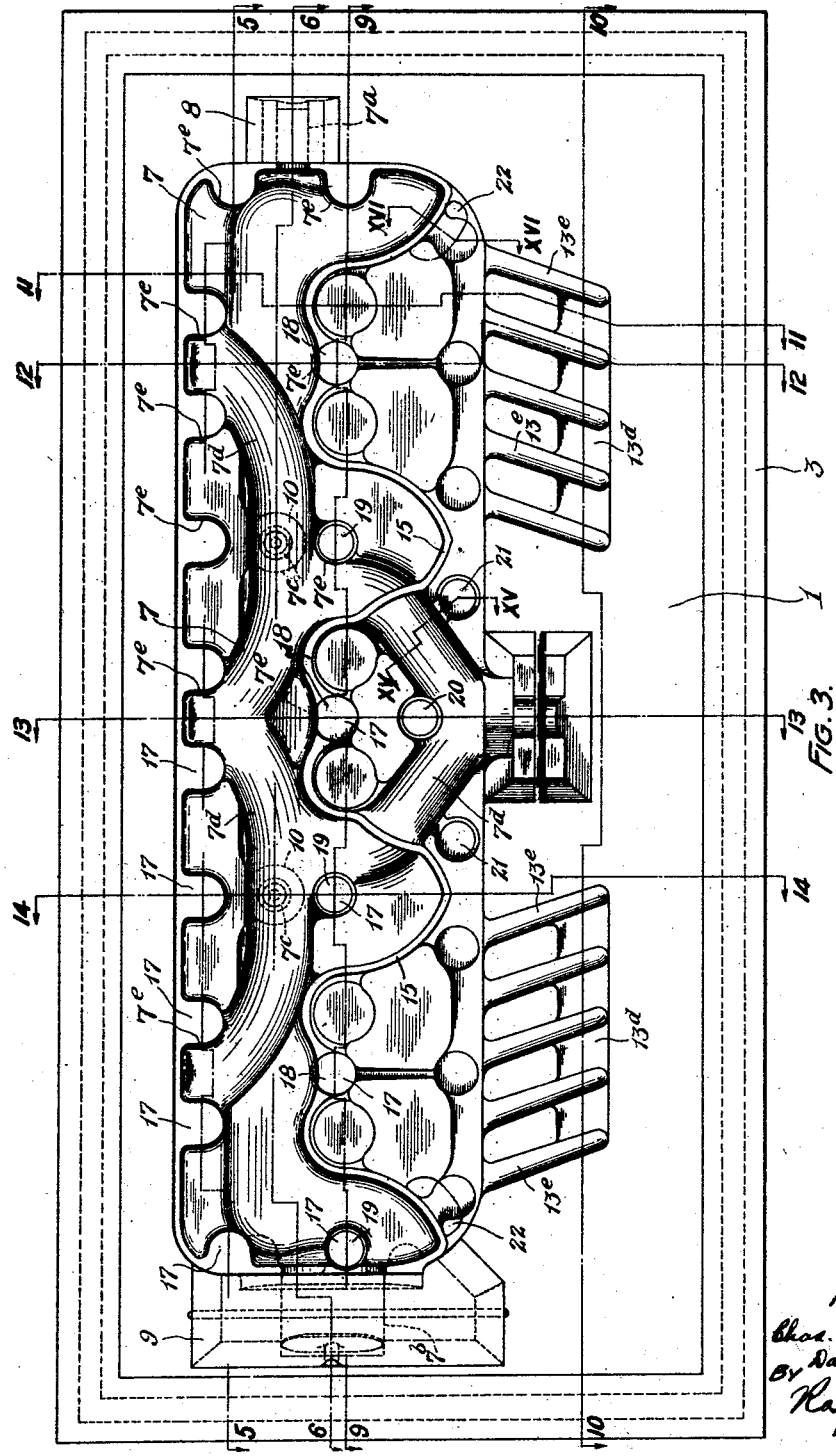
Fig. 3 is a plan view on a larger scale of the mold drag.

The main body of the drag, which is shown in plan in Fig. 3 and in section in Figs. 5, 6, 9 and 11 to 14, is preferably formed of ordinary green molding sand. Substantially the entire mold or casting cavity is formed in the drag, the arrangement being such that the top of the cylinder head is down while the bottom of said casting, which forms the inner surface of the cylinder head, is up and substantially level with the top surface of the drag. In the drag is placed a baked sand core 7 which forms the water jacket chamber of the casting. This core is formed at one end with a cylindrical extension $7^a$ and at its other end with a heavier oval extension $7^b$ which engage recesses in the drag so as to support the core (see Figs. 3, 6, 7 and 8). Over the core extensions $7^a$ and $7^b$ are placed baked sand blocks 8 and 9 which are recessed to fit the extensions and have their top surfaces in line with the top surface of the drag. The core 7 is also formed on its under side with two bosses $7^c$, $7^c$ which engage recesses in small metal chills 10, 10 embedded in the green sand of the drag, thus furnishing additional support for the core. The holes formed by these bosses in the wall $b$ of the casting can be closed with plugs.

The cope 2 is formed of baked sand. The main body of the cope can be made of ordinary core sand but we prefer to provide it with a facing $2^a$ of specially fine core sand. In practice we make the facing sand mixture with the following composition:

12 buckets (15 quarts capacity) Michigan City (sharp) sand, 12 buckets bank sand, 8 quarts core oil (or 7 quarts linseed oil).

The backing sand mixture is made up with the following composition:

4 buckets old (burnt) sand, 4 buckets Michigan City sand, 4 buckets bank sand, 4 quarts rosin, 4 quarts pitch.

To the inner side of the cope is pasted a baked sand core 11 which forms the chamber of the fuel intake passage of the cylinder head. As is shown in Figs. 4 and 5, the core 11 is formed with three tapered extensions $11^a$ and also with a cylindrical extension $11^b$ which engage suitable recesses in the cope.

The cope 2 has embedded in it a series of six projecting metal chills 12, 12 which are designed to form the recesses $a'$ of the cylinder casting, previously referred to. Each chill has formed on its back surface a loop or eye $12^a$ which serves to effectively lock it in the sand and also serves as a convenient handle by which the chills can be picked up with a hook when the hot mold is broken up. Bosses $2^b$ on the cope serve to form some of the larger water circulating openings $b^2$ of the cylinder head. The cope 2 is formed with a plurality of risers 14, 14 which extend upward from the mold cavity proper in a manner and for purposes which will presently be explained.

The mold is provided with two pouring gates, designated in their entireties by 13, 13 (see Figs. 10, 12 and 14), and formed partly in the cope and partly in the drag. Each gate comprises a sprue $13^a$ with a flared opening to receive the molten metal from the pouring ladle. The sprue leads into one end of horizontally extending skim chamber $13^b$ of large capacity. With the other end of this chamber a riser $13^c$ communicates, said riser like the sprue $13^a$ having a flared top. The skim chamber $13^b$ overlies a shallow depression $13^d$ in the top of the drag and this depression communicates by means of a series of shallow, restricted ingates $13^e$ with the adjacent side of the mold cavity at the top thereof.

Referring to the various longitudinal and transvere sectional views of the assembled mold, it will be observed that the cores 7 and 11 are disposed in relation to the drag and the cope and in relation to each other in a manner to form the casting as shown in plan and elevation in Figs. 17, 18 and 19 and as shown in finished form in Figs. 20 to 32, inclusive. Thus the core 7 is formed with depressions $7^d$ to accommodate the core 11 and form the walls of the fuel intake passage with its inlet at one side of the casting and its three outlets at the other side. The core 7 is also formed with two longitudinally extending series or rows of vertical passages or recesses $7^e$, $7^e$ which serve either alone or in conjunction with adjacent surfaces of the drag and the core 11 to form the through-bolt bosses of the casting. Thus the mold cavity proper comprises a bottom section 15 to form the comparatively thin water jacket walls of the casting, a top section 16 to form the thicker main wall of the cylinder head and the two longitudinal series of interconnecting sections 17 provided by the core passages 7$^e$ and forming the through-bolt bosses of the casting. The two series of risers 14 formed in the cope are arranged to register with the two series or rows of interconnecting sections 17 of the mold cavity.

As is shown in Fig. 9, the drag is provided with embedded metal chills 18, 18 and 19, 19 which are exposed to the lower ends of some of the interconnecting sections 17 of the mold cavity. A corresponding chill 29 is provided for one of the interconnecting cavity sections, as indicated in Fig. 13. In addition we have found it advantageous to provide the drag with metal chills 21, 21 and 22, 22, as shown in Figs. 3, 15 and 16.

The preferred composition of the baked sand cope has already been stated. While the cope may be formed by any desired procedure, its structure is such as to lend itself readily to rapid and efficient methods of production. We prefer to provide a machine or fixture consisting essentially of a metal base plate with parts attached thereto to form the skim chamber of the gate and having also a series of low bosses to form the lower slightly flared ends of the risers 14. Detachable tapered pins or sprues are then readily set up to form the pouring sprues of the gate and the risers of the gate and as the risers 14 are arranged in two rows the sprues forming them can be conveniently attached at their upper ends to two bars so that these sprues are readily handled in two groups or units.

The cores 7 and 11 may be made of any suitable core sand mixture but we prefer a mixture made up of 6½ quarts of linseed oil and 24 buckets of Michigan City sand. To give the core 7 a smooth surface, after the usual baking it is preferably painted with graphite and then dried with a torch. In making the core 11, it is first baked, and then painted with graphite. Next it is pasted to the cope and baked with the latter. The core 11 is thus double baked. When pasting the core 11 to the cope, removable aluminum spacers are introduced between the core and the cope and left during baking and until the cope is ready for use. The accurate relative positioning of the cope and core is thus insured. All of the baked sand parts of the mold, after baking, are rubbed over by the molder in accordance with the usual practice to render them as smooth as possible.

Before the cope is assembled on the drag the large chills 12 are coated with a liquid paint or mixture composed of iron oxide and alcohol. This coating prevents condensation of moisture on the chills and the resultant formation of vapor in the mold cavity when the hot metal is poured.

It will be understood that the cores 7 and 11 are strengthened by the usual reinforcing wires, not shown, and it will also be understood that the cores are preferably vented by embedding wax rods or wires therein which are melted out when the cores are baked. We prefer also to provide vent passages around the core extension 7$^b$ and the baked sand block 9, as shown in Figs. 6 and 8.

The drag of the mold is preferably made on a molding machine in accordance with well-known standard practice, the chills 10, 18, 19, 20, 21 and 22 being introduced by assembling them on the pattern when the drag is formed.

In the operation of the mold, the parts having been assembled as shown in the drawings and as above described, the molten metal, such as suitable aluminum alloy, is poured simultaneously through the two pouring gates or sprues 13$^a$. The molten metal quickly fills the skim chambers 13$^b$ and rises in the risers 13$^c$. From the bottom of the skim chambers the metal is fed gradually and quietly through the relatively restricted ingate passages 13$^e$ into the adjacent side of the mold cavity at the top thereof.

As will be seen from inspection of Fig. 12, the metal first flows down into the bottom of the mold cavity filling the bottom section 15 thereof and thereafter as the pouring continues rises in the cavity to form the jacket side wall and bolt boss sections and finally the main wall of the cylinder head; and when the cavity has filled the metal rises into the numerous risers 14 which extend upward from the heavy interconnecting sections of the mold cavity, as previously described. As the molten metal flows into the mold cavity and gradually fills the same the air in the cavity and all vapors and gases which the hot metal drives off from the green sand and the baked sand core and cope parts, find an exceedingly free vent through the numerous risers 14 and also through the porous body of the baked sand cope itself. Consequently the casting produced is substantially entirely free from porosity due to occluded vapors or gases.

In the pouring of the castings, the thin casting sections at the bottom of the mold cavity are naturally the first to freeze. The freezing of the metal in the bottom parts of the heavier interconnecting sections of the cavity is hastened by the chills 18, 19 and 20. The freezing then progresses upward through the mold cavity, the upper parts of the heavy interconnecting sections which form the bolt bosses of the casting being the last to completely freeze and being maintained meantime in communication with the still molten metal in the heavy risers 14. This molten metal in the risers makes up for the heavy crystallization shrinkage in the heavy bolt boss sections of the casting so that there are no draws in these sections and no shrinkage cracks where the heavy later freezing sections join the thin earlier freezing sections. The chills 18, 19 and 20 cooperate with the molten metal in the risers 14 to secure this result.

When the casting has been poured the mold is opened and the cope lifted off. The strength of the baked sand cope is such that the casting is lifted with it from the mold, the sprues and risers formed on the casting, by reason of their flared formation, serving to secure the casting quite strongly to the baked sand mass so that the cope and casting can be lifted and handled as a unit. This is a great convenience in the use of our improved molds on a commercial scale as it enables the baked sand cope with the attached casting and its enclosed baked sand cores to be lifted off the green sand drags and loaded on a truck for transport away from the pouring floors, where the green sand drags are made up, to a suitable point where the baked sand parts can be broken up and separately handled. In this latter separate handling the gate and riser projections of the casting are broken off and the large chills 12 recovered, while the broken up baked sand parts are fed to the usual screening and reconditioning apparatus.

It will be observed that the form of the large chills 12 is such that the contraction of the metal in the casting as it freezes and cools tends to force the chill from its seat in the casting and consequently the chills are readily separated and no undue stresses are placed upon the casting. This is a matter of some importance in view of the hot shortness characteristic of such metals as the aluminum alloys.

The chills 12 form the recesses $a'$ in the underface of the cylinder head and as the chills are exceedingly smooth the resulting walls of said recesses are also very smooth. Consequently it is only necessary in finishing the casting to subject the plain, flat under surface of the cylinder head to a simple machining operation in order to secure the desired smooth head walls for the combustion chambers of the engine.

While we have described our mold as having a green sand drag it is to be understood that the drag can be made of baked sand, if desired. Indeed in some cases where the problem of venting is exceedingly difficult it may be necessary to make the drag as well as the cope of baked sand. But in most cases, such as that illustrated for example, we find it possible to secure adequate venting and castings substantially free from porosity by the use of a baked sand cope with numerous risers. The venting of the mold cavity during pouring, which is effected through the risers 14 and through the highly porous body of the baked sand cope which closes the top of the mold cavity, is so exceedingly free and effective that practically no gases are occluded in the molten metal and this accounts, we believe, for the substantial freedom from porosity of the castings produced in our mold. At the same time the progressive freezing of the metal in the mold cavity beginning in the thin sections at the bottom of the cavity and most remote from the supplies of molten metal and extending gradually toward the source of such molten supply obviates all unsoundness incident to draws and shrinkage cracks because as crystallization of the metal occurs at any point such point is still in unbroken communication with the molten metal supply in some one of the various risers.

The improved results thus secured by means of our improved mold will readily be appreciated by those familiar with the production of light alloy castings. Indeed we believe that we are the first to succeed in the commercial production on a substantial scale of sound and satisfactory aluminum alloy water-jacketed cylinder head castings. Prior to our development of the present improved form of mold we, as well as others, had found it impossible to produce castings of this character reasonably free from porosity and shrinkage cracks and draws without defective losses that were prohibitive. Water-jacketed cylinder head castings must not leak when tested under considerable hydraulic pressure and consequently the walls of the casting must be substantially free from porosity.

As has been pointed out the core parts of the mold are positioned and secured in definite relation to each other and to the body of the mold by their engagement with the baked sand cope or other baked sand parts which themselves engage the baked sand cope. Thus, in view of the hardness and accurate form of the baked sand parts, accurate positioning of the core parts is insured and the sections of the castings produced are uniformly accurate. This is especially important where it is desirable, as in engines for motor vehicles, to keep the weight of the parts down to a minimum. Naturally the casting sections can be designed thinner if uniform accuracy is insured than would be permissible if such accuracy were not insured.

While for the sake of clearness we have illustrated and described in detail a particular form of mold, it will be understood that our improvements are applicable to various forms of castings and can be carried out in various ways other than those set forth, the scope of our invention being indicated in the appended claims.

What we claim is:

1. A mold for forming chambered castings of low melting point metal, said mold having a cavity with sections forming the bottom walls of the casting (as it lies in the mold), sections forming the top walls of the casting and interconnecting sections extending upward from the bottom wall sections to the top wall sections to form interconnecting parts of the casting, and said mold comprising a drag and a cope which is formed of baked sand and has risers extending upward from the interconnecting sections of the mold cavity.

2. A mold for forming chambered castings of low melting point metal, said mold having a cavity with sections forming the bottom walls of the casting (as it lies in the mold), sections forming the top walls of the casting and interconnecting sections extending upward from the bottom wall sections to the top wall sections to form interconnecting parts of the casting, and said mold comprising a cope having risers extending upward from said interconnecting sections of the mold cavity, the said riser being of sufficiently large caliber to maintain the metal therein molten until the metal in the mold cavity proper has frozen.

3. A mold for forming chambered castings of low melting point metal, said mold having a cavity with sections forming the bottom walls of the casting (as it lies in the mold), sections forming the top walls of the casting and interconnecting sections extending upward from the bottom wall sections to the top wall sections to form interconnecting parts of the casting, the said bottom walls of the casting being thinner than its top walls and interconnecting parts, and said mold comprising a cope having risers extending upward from the interconnecting sections of the mold cavity.

4. A mold for forming chambered castings of low melting point metal, said mold having a cavity with sections forming the bottom walls of the casting (as it lies in the mold), sections forming the top walls of the casting and interconnecting sections extending upward from the bottom wall sections to the top wall sections to form interconnecting parts of the casting, and said mold comprising a drag formed of sand with chills embedded therein opposite the said upwardly extending sections of the cavity and a cope formed of baked sand and having risers extending upward from said interconnecting sections of the cavity.

5. A mold for forming chambered castings with low melting point metal, said mold having a cavity with sections forming relatively thin bottom walls of the casting (as it lies in the mold), sections forming the top walls of the casting and interconnecting sections extending upward from the bottom wall sections to the top wall sections to form relatively thick interconnecting parts of the casting, and said mold comprising a drag formed of sand with chills embedded therein opposite the said upwardly extending sections of the cavity and a cope formed of baked sand and having risers extending upward from said interconnecting sections of the cavity.

6. A mold for forming chambered castings of low melting point metal, said mold having a cavity with sections forming relatively thin bottom walls of the casting (as it lies in the mold), sections forming the top walls of the casting and interconnecting sections extending upward from the bottom wall sections to the top wall sections to form relatively thick interconnecting parts of the casting, and said mold comprising a drag formed of sand with chills embedded therein opposite the said upwardly extending sections of the cavity and a cope having risers extending upward from said interconnecting sections of the cavity.

7. In a mold, the combination of a green sand drag and a cope formed of baked sand and having a plurality of upwardly flared sprue and riser passages so disposed that the flared sprue and riser extensions of the casting formed secure the casting to the cope and enable the casting and the baked sand mass of the cope to be handled as a unit when the mold is broken up.

8. In a mold for chambered castings, the combination of a green sand drag, a cope formed of baked sand, and baked sand cores, the said cope having a plurality of upwardly flared sprue and riser passages so disposed that the flared sprue and riser extensions of the casting formed secure the casting to the cope and enable the casting with its contained core sand and the baked sand mass of the cope to be handled as a unit when the mold is broken up.

9. In a mold, the combination of a body formed in part of green sand and in part of baked sand, and baked sand core parts, the core parts being positioned in the mold cavity by engagement with the baked sand body structure.

10. A mold for forming a cylinder head casting having an inner side that is in part of uniform conformation susceptible of being finished by simple machine work and in part of irregular conformation not susceptible of being machine finished, said mold having a composite body structure with sand walls for forming the casting surfaces of uniform conformation and metal walls for forming the casting surfaces of irregular conformation.

11. A mold for forming of low melting point metal a cylinder head casting having an inner side that is in part of uniform conformation susceptible of being finished by simple machine work and in part of irregular conformation not susceptible of being machine finished, said mold having a composite body structure with sand walls for forming the casting surfaces of uniform conformation and metal walls for forming the casting surfaces of irregular conformation, said metal walls being covered with a non-conducting coating adapted to prevent condensation of moisture thereon and resultant porosity of the casting due to vapor in the mold cavity.

12. In a mold for casting an internal combustion engine cylinder head having a water jacket and a fuel intake passage through the jacket, the combination of a drag having the major part of the mold cavity formed therein, a water jacket core supported in the drag, a baked sand cope, and a fuel passage core attached to the cope.

13. In a mold for casting an internal combustion engine cylinder head having a water jacket and a fuel intake passage through the jacket, the combination of a green sand drag having the major part of the mold cavity formed therein, a water jacketed core supported in the drag, a baked sand cope and a fuel passage core attached to the cope.

14. In a mold for casting an internal combustion engine cylinder head having a water jacket and through-bolt bosses joining the head wall proper and the jacket wall, the combination of a green sand drag in which the major part of the mold cavity is formed with the water jacket side of the cavity down, a baked sand cope forming the top walls of the mold cavity and having riser passages to form upward extensions of the said bolt bosses of the casting.

15. In a mold for casting an internal combustion engine cylinder head having a water jacket and through-bolt bosses joining the head wall proper and the jacket wall, the combination of a green sand drag in which the major part of the mold cavity is formed with the water jacket side of the cavity down, said drag having metal chills embedded therein, directly beneath the bolt boss sections of the mold cavity, a baked sand cope forming the top walls of the mold cavity and having riser passages to form upward extensions of the said bolt bosses of the casting.

16. In a mold having a horizontally elongated cavity, a gate to introduce the metal into the cavity comprising an elongated substantially horizontally extending skim chamber of great depth, a sprue leading downward into one end of said chamber, a riser leading upward from the other end of said chamber, and a plurality of ingates of restricted capacity leading from the lower part of the skim chamber into the mold cavity at different points along its length.

In testimony whereof, we hereunto affix our signatures.

CHARLES B. BOHN.
DANIEL FROWN.